Patented Sept. 7, 1948

2,448,729

UNITED STATES PATENT OFFICE 2,448,729

METHOD OF PROCESSING RICE BRAN AND RICE POLISH

Ataullah K. Ozai-Durrani, Stuttgart, Ark.

No Drawing. Application September 11, 1943, Serial No. 501,971

5 Claims. (Cl. 99—80)

This invention relates to a method of processing rice bran and rice polish to separate therefrom the valuable vegetable oil content thereof, converting the bran and polish into valuable food products relatively high in vitamin content and containing substantially intact substantially all of the vitamin and food values originally present therein, which is substantially stable and resistant to deterioration upon exposure to the atmosphere for an extended time interval.

One object of the invention is to provide a method of extracting the vegetable oil content of rice bran and rice polish without detrimentally affecting the vitamin content and normal food value of the said bran and polish.

Another object is to provide a method of treating rice bran and rice polish to convert the same into an edible food product high in vitamin content and containing substantially intact the original food values thereof, but substantially free of vegetable oils.

Still another object is to provide a method of processing rice bran and rice polish to obtain a vegetable oil fraction and a vegetable oil-free fraction high in vitamin and food value.

Other objects will be apparent as the invention is more fully hereinafter disclosed.

In accordance with these objects I have discovered that the average vegetable oil content of rice bran and rice polish approximates 15% at the time the said bran and polish is removed from the rice grain, but that by oxidation and enzymic action this vegetable oil content is materially lowered.

I have found that by oxidation and enzymic action the vegetable oils and proteins are progressively changed into other compounds such as fatty acids, some of which compounds are not soluble in solvents for the vegetable oils and fatty acids. These solvent insoluble compounds detrimentally affect the edibility of the oil-free bran and polish.

In view of this discovery I have devised the following method for treating rice bran and polish or mixtures of the same to separate therefrom the maximum of the valuable vegetable oil content and at the same time convert the said bran and polish or mixtures of the same into an edible food product rich in vitamin and in natural sugars, starches, glutens and proteins, that is stable against deterioration in the atmosphere over extended time periods.

The invention in its broadest concept contemplates subjecting the rice bran or polish or mixtures of the two to an agglomeration step immediately or within a relatively short time interval after the bran and polish have been removed from the rice grain and converting the same into porous aggregates and subjecting the porous aggregates to an oil-extraction operation using a vegetable oil solvent which subsequently may be removed substantially completely from the oil-free aggregates, thereafter freeing the oil-free aggregates of the excess solvent present therein, and crushing the aggregates to fine powder, toasting or otherwise treating the same to render the oil-free bran or polish edibly attractive.

In the adaptation of this broad concept commercially, the concept is adapted to wide modification without essential departure therefrom, depending upon the precise method and means adopted to accomplish agglomeration and the precise method and means adapted to accomplish the oil extraction, bearing in mind the temperature limitation expressed.

In the absence of agglomeration, the practice of any oil extraction method is impractical and substantially inoperative due to the fact that the particle size of the rice bran and polish varies widely from a size approximating colloidal sized particles passing through any of the usual type filter materials up to a size as large as 100 mesh. In general, rice bran consists in major part of relatively large sized particles, whereas rice polish consists in major part of relatively small sized particles.

I have discovered that the natural sugars, starches and glutens of rice bran and polish are partially soluble in water and form with water a binder that may be utilized in the aggregation of the material into porous aggregates suitable for oil extraction purposes. The amount of water required for the purpose of accomplishing the aggregation of the rice bran and polish may vary widely depending upon the precise aggregation method employed.

As one example of the aggregation step of the present invention, but not as a limitation of the same, I may employ what is known in the art as the extrusion process. In this general method the material is converted into a plastic mass and extruded under pressure into elongated articles such as a rod or strip. In the adaptation of this method of forming aggregates, I add to the rice bran or polish or mixture of the two, a sufficient amount of water to solubilize at least a part of the sugar, starch or gluten to obtain a binder solution and to convert the same into an extrudable plastic mass and then subject this mass to extrusion into elongated rods or strips, preferably of relatively small thickness, which rods or strips are then subjected to drying in a substantially inert or non-oxidizing atmosphere to substantially eliminate the added water content thereof. After such drying, the dried lengths of material are broken up into appropriate sized particles for use in the oil extraction operation and are screened to eliminate therefrom the smaller particle sized material which is returned for remoistening in admixture with fresh bran and polish. Alternatively, the strips may be broken up before drying, without departure from the present invention.

As an illustration, rice polish or mixtures of rice bran and polish containing approximately equal amounts of each, when moistened with from 15 to 25% (by weight) of water will form a doughy plastic mass readily extrudable under slight pressure into elongated strips or rods. Preferably, the thickness of the strip or rod approximates one (1) millimeter and from ¾ to 1 centimeter in width. These elongated strips on being heated to temperatures not over about 140° F. (60° C.) in an inert or substantially non-oxidizing atmosphere such as nitrogen or carbon dioxide, may be rapidly freed of the free moisture content present therein with resultant precipitation of the dissolved sugar and other salts and with consequent aggregation of the multi-sized particles of the bran and polish into a relatively strong porous structure readily permeable to organic solvents. This elongated porous structure can readily be broken up into fragments of a size utilizable in any given or selected oil extraction method.

Alternatively, the rice polish or bran or mixtures of the two may be pelletized mechanically by any of the means heretofore old in the art, such as for example, by standard type pelletizing machines into which the material and water are fed continuously and separately for mechanical agitation and continuous discharge therefrom in the form of pelletized agglomerates upon traveling grates conducting the same through a heat zone under the protection of an inert or non-oxidizing atmosphere.

In the practice of the agglomeration step of the present invention the essential features are to employ sufficient water to form a binder with the water soluble natural sugars, starches and glutens of the material and to agglomerate into porous aggregates and dry the aggregates to as low a water content as is economically practical in as short a space of time as is possible and under substantially non-oxidizing conditions thereby to avoid the deleterious effects of enzymic action and oxidation on the oil and protein content of the bran and polish. Various alternative ways of accomplishing this result will be suggested to one skilled in the art from the above disclosure.

In the practice of the oil extraction operation, various types of apparatus and a number of different solvents are utilizable. Prior to introducing the aggregates into the solvent I have found it preferable to remove the greater portion of the air content thereof by evacuation or by displacement of the same with an inert gas, such as nitrogen and $CO_2$, to avoid the formation of explosive mixtures of air and solvent. The most economically practical method of oil extraction is one in which the dried aggregates and the solvent are circulated countercurrent to each other with the aggregates passing finally through a heat zone or through a vacuum distillation apparatus to free the same of the last traces of the solvent.

In general, I have found it inadvisable to subject the rice bran or polish to temperatures in excess of about 140° F. (70° C.) in order to avoid thermal decomposition of some of the food values contained therein or destruction of the vitamin content thereof. In view of this general limitation, the solvent employed should have a boiling point of about 140° F. (70° C.). Hexane (hexyl hydride; caproyl hydride) $C_6H_{14}$ having a boiling point of 69° C. and a specific gravity of 0.660 appears to be the most suitable of the plurality of solvents adapted for use in the present invention.

Preferably the solvent is warmed to a temperature slightly below its boiling point to accelerate the extraction of the oil from the aggregates. One type of oil extraction apparatus found quite suitable for the purposes of the invention comprises an extraction chamber closed to the atmosphere except through an opening enclosed by a reflux condenser preventing the escape of hexane vapors to the atmosphere within which chamber is disposed a column of the aggregates. The bottom of the chamber is provided with a screened drainage opening communicating to a siphon conducting the drainage fluid to a distilling apparatus maintained at a temperature above the boiling point of the solvent, the solvent vapors being delivered to the upper part of the said chamber for condensation in the reflux condenser and return to the chamber.

In this type apparatus the batch of aggregates is subjected to the extraction of the oil content by a continuous supply of fresh solvent from the distillation apparatus with concentration of the oil in the distillation apparatus. The time required to obtain substantially complete extraction of the oil content of any given batch of aggregates depends upon the mass of aggregates, the relative amount of solvent to the mass of aggregates, the solvent temperature, and upon the porosity of the aggregates, as one skilled in the art will recognize.

By the use of this type of apparatus, using hexane as a solvent and maintaining a solvent temperature of about 55–60° C. in the container, I have been able to extract substantially 100% of the oil content of the aggregates in a relatively short time interval. For example, one batch of aggregates which originally contained 17.51% vegetable oil was found to contain only .11% vegetable oil after being treated as above described. Numerous other batches yielded approximately similar results.

Following treatment, as above described, the aggregates are drained free of solvent and are treated to remove the residual solvent contained therein, preferably by heating under atmospheric or lower pressures at temperatures not in excess of 70° C. (140° F.) or in a strong current or under pressure of steam.

The vegetable oil collected in the distillation flask usually contains, in addition to the vegetable oil, substantially all of the chlorophyl present in the bran and polish, together with any fatty acids present in the oil and other solvent soluble compounds and must be treated in accordance with known methods for the separation of these contaminants therefrom prior to use.

The removal of the chlorophyl from the bran and polish by the solvent materially changes the color of the bran and polish converting it to an off-color white from its original light tan or brown color.

An alternative oil extraction method is one wherein the aggregates are conveyed by a screw conveyor through a horizontally sustained tubular container countercurrent to the flow of the solvent therethrough, the solvent being heated in any convenient manner to the desired temperature of 55–60° C. From the container the aggregates are delivered to a thermal or vacuum chamber, wherein the retained solvent is removed and returned to the system and the oil-saturated solvent is delivered to a distillation apparatus from which the solvent distillate is condensed and returned to the system. This type of apparatus is old and well known in the art as is also the type of oil extraction apparatus previously described, and, per se, forms no part of the present invention. The advantage of this latter type of apparatus over the first type is that of continuous operation as contrasted to batch operation. Either type, however, produces, when properly operated, satisfactory and substantially equivalent oil-extraction results.

Whereas, as above indicated, it is preferable to subject the bran and polish to agglomeration as soon as possible after separation from the rice grain to eliminate loss of oil by oxidation and enzymic action with consequent detrimental contamination of the oil-freed bran or polish with oil-oxidation and enzymic reaction products, the invention is not necessarily limited to practice upon such freshly prepared bran or polish. Bran or polish, which as a result of oxidation and enzymic reaction has become rancid, when treated in accordance with the present invention and freed of remaining oil and free fatty acids present therein is converted into a product readily eaten by animals without apparent detrimental effects even though not necessarily of the quality suitable for human consumption.

Following the extraction of the oil by the practice of the present invention, I have found it advisable to subject the oil-free material to a toasting operation in order to kill off all bacteria and bacteria spores and to bring out the flavor of the material for human consumption. So toasted, the oil-free product has been found to keep indefinitely without deterioration in the atmosphere.

From the above description of the present invention it is believed apparent that the same may be widely varied without essential departure therefrom and all such modifications and adaptations are contemplated as may fall within the scope of the following claims.

What I claim is:

1. The method of treating material consisting of at least one of the products rice bran and rice polish to effect the removal therefrom of the vegetable oil content thereof, which comprises mixing therewith an amount of water at least sufficient to solubilize at least a part of the natural sugar, starch and gluten content to form a binder, agglomerating the moistened material into larger sized aggregates, drying the said aggregates at a maximum temperature of about 140° F. to avoid decomposition of the vitamin and food values contained therein and in an inert atmosphere substantially free of oxidizing gases, and subjecting the dried aggregates to the oil extractive action of a fluid vegetable oil solvent under reduced pressure and at a maximum temperature of about 140° F.

2. The method of treating material consisting of at least one of the products rice bran and rice polish to effect the removal therefrom of the vegetable oil content thereof, which comprises mixing therewith a sufficient amount of water to form a plastic extrudable mass, extruding the said plastic mass into elongated relatively thin sectioned pieces, drying the said pieces in an inert substantially non-oxidizing atmosphere at a maximum temperature of about 140° F. to avoid decomposition of the vitamin and food values contained therein, and subjecting the dried pieces to an oil extraction operation under reduced pressure at a maximum temperature of about 140° F. to avoid decomposition of said vitamin and food values contained therein.

3. The method of treating material consisting of at least one of the products rice bran and rice polish to render the same substantially free of vegetable oils and to convert the same into an edible food product, which comprises moistening the same within a short time of its removal from the rice grain with water in an amount at least sufficient to solubilize at least a part of the natural sugar, starch and gluten content forming a binder solution, agglomerating the moistened material into aggregates, drying said aggregates at a maximum temperature of about 140° F. to avoid decomposition of the said vitamin and natural food values contained therein and in an inert atmosphere substantially free of oxidizing gases, and subjecting the dried aggregates to an oil extraction process using a vegetable oil solvent under reduced pressure and at a maximum temperature of about 140° F. to avoid decomposition of the said vitamin and food values of the material.

4. The method of claim 3, wherein the amount of water added to the material is at least sufficient to convert the same into a plastic extrudable mass and wherein agglomerating into aggregates consists in the extruding of the said mass into elongated relatively thin strips.

5. The method of claim 3, wherein said vegetable oil solvent consists of hexane.

ATAULLAH K. OZAI-DURRANI.

REFERENCES CITED

The following references are of record in the file of this patent:

UNITED STATES PATENTS

| Number | Name | Date |
|---|---|---|
| 707,059 | Gaff | Aug. 12, 1902 |
| 953,946 | Finkler | Apr. 5, 1910 |
| 1,387,710 | Harrison | Aug. 16, 1921 |
| 1,762,690 | Kopf | June 10, 1930 |
| 1,189,130 | Kellogg | June 27, 1916 |
| 1,949,895 | Bernardine | Mar. 6, 1934 |
| 2,071,434 | Sarnmark | Feb. 23, 1937 |
| 2,093,285 | McKay | Sept. 14, 1937 |
| 2,180,256 | Printon | Nov. 11, 1939 |
| 2,263,301 | James | Nov. 18, 1941 |
| 2,314,282 | Levin | Mar. 16, 1943 |
| 2,336,166 | Davis | Dec. 7, 1943 |

OTHER REFERENCES

Texas Agricultural Experimental Station Bulletin, No. 191, "The Composition of Rice and Its By-Products," Von Boeckman-Jones Co., 1916, page 36.